April 7, 1942.  V. FOLLET  2,278,720
FIXTURE JOINT
Filed April 29, 1940
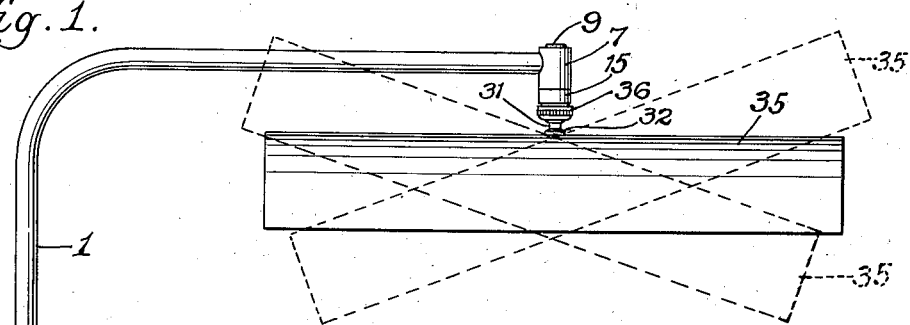
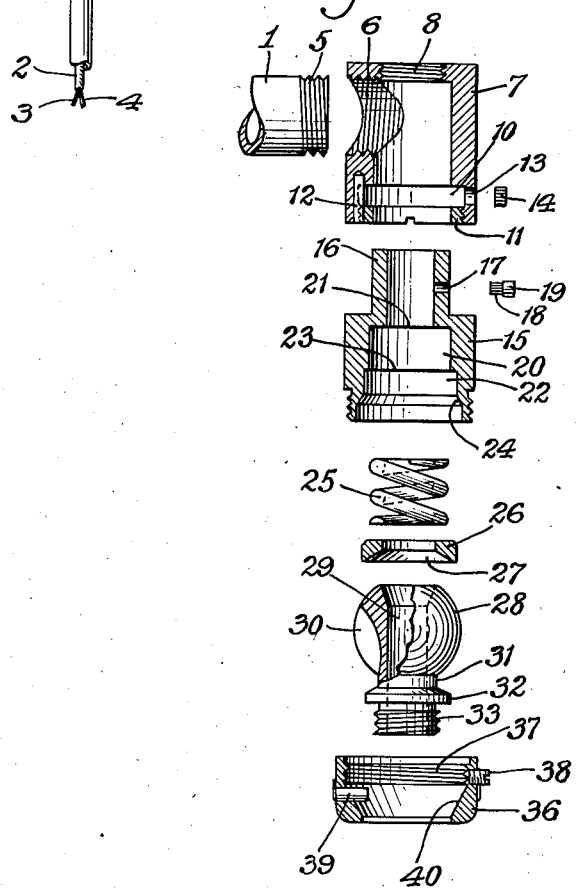
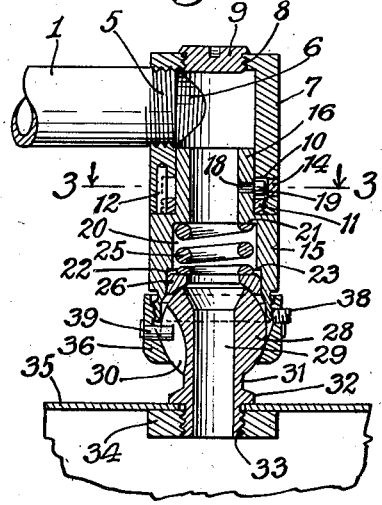
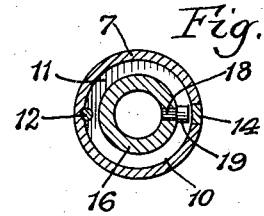
Inventor.
Vermont Follet.
by Parker & Carter
Attorneys.

Patented Apr. 7, 1942

2,278,720

UNITED STATES PATENT OFFICE 2,278,720

FIXTURE JOINT

Vermont Follet, Elmhurst, Ill., assignor to Standard Screw Company, Hartford, Conn., a corporation of New Jersey Application April 29, 1940, Serial No. 332,324

3 Claims. (Cl. 285—97.3)

This invention relates to a fixture joint and particularly to one in which at least two members are associated together for relative rotary or swiveling movement and in which there is additionally attached a member permitting relative rotary movement about an axis at an angle to the swiveling axis. It has for one object to provide a lamp bracket joint by means of which a lamp may be rotated about a generally vertical axis and may additionally be tilted about a generally horizontal axis. Another object is to provide in connection with a joint of the sort indicated friction means for controlling the tilting movement and for holding the parts in whatever position they have been tilted to. Another object is to provide in a joint of the type generally indicated means whereby a single member serves both as a part of the swiveling joint and as a part of the tilting joint. Other objects will appear from time to time throughout the specification and claims.

The invention is illustrated more or less diagrammatically in the accompanying drawing wherein Figure 1 is a side elevation of a lamp and bracket to which the joint of the present invention is applied.

Figure 2 is a generally longitudinal sectional view taken on an enlarged scale and showing the joint of Figure 1.

Figure 3 is a transverse section taken at line 3—3 of Figure 2.

Figure 4 is a longitudinal section showing the parts of Figure 2 in position for assembly but in separated relationship.

Like parts are designated by like characters throughout.

1 is an arm or bracket which is hollow and through which a conduit 2 containing wires 3 and 4 may pass. Such an arm may be rigidly mounted or mounted for swiveling movement. It is threaded at its outer end as at 5 to engage a correspondingly threaded perforation 6 in the outer joint member 7. The member 7 is hollow as shown. It may have a threaded perforation 8 in one end if desired and if present the perforation 8 may be closed by a threaded plug 9.

Adjacent its outer or open end the member 7 may have an internal groove 10. This groove may be formed directly in the material of the member 7 or it may be formed in part in that member and in part by means of a threaded gland 11. A pin 12 is positioned within the member 7 and extends into the groove 10. A perforation 13 extends through the side wall of the member 7 and into the groove 10 and may be closed by a plug 14 which is preferably shaped to be driven into place.

A second hollow housing member 15 is provided with a reduced portion 16 shaped to fit into the hollow interior of the member 7 and preferably of such size as to fit smoothly therein for rotation. A perforation 17 is formed in the wall of the reduced portion 16 to receive a pin 18 of which the head 19 lies within the groove 10 when the parts are assembled as shown in Figure 2.

The interior of the larger or main portion of the member 15 is enlarged as at 20 and may be provided with a shoulder 21. A further enlargement 22 may be formed in which a shoulder 23 is also formed. If desired, a taper portion 24 may be formed in the member 15.

A compression spring 25 forms a part of the tilting portion of the joint and preferably lies within the enlarged interior 20 and bears at one end against the shoulder 21. At its other end the spring 25 bears against a sliding or movable friction member 26 which has a rounded or partially spherical surface 27. This surface in part forms a socket for the ball 28 which is hollow as at 29 and fits within the socket as shown in Figure 2. The ball portion 28 is cut away or slotted as at 30, the slot being substantially at right angles to the planes which bound the groove 10. At its outer end the ball member 28 is joined to a portion 31 which may carry a collar 32 and be exteriorly threaded as at 33 to engage a correspondingly threaded member 34 fixed in the lamp house or shade 35.

The ball is retained in place by a gland 36 which is interiorly threaded as at 37 and engages corresponding threading on the member 15. When the gland 36 has been screwed to the point desired, a set screw 38 holds it against displacement. The gland carries an inwardly extending pin 39 which lies within the groove 30 when the parts are assembled as shown in Figure 2. A portion of the inner surface of the gland 36 is inclined or tapered as at 40. This surface and the surface 27 may if desired be partially spherical or may be merely inclined.

Although there is shown an operative form of the device, it will be understood that many changes in the form, shape and arrangement of parts might be made without departing from the spirit of this invention, and it is wished that the showing be taken as, in a sense, diagrammatic.

The use and operation of this invention is as follows:

The parts are assembled generally as shown in Figures 1 and 2. Although the lamp is shown as supported upon a bracket or arm 1 which comes in from the side it might be supported upon a bracket or arm coming in from the top and engaging the opening 8. If that were done the plug 9 of course would be positioned in the opening 6 instead of the opening 8 and the opening 8 would receive the bracket or arm. The invention is, therefore, not limited to any particular type of bracket or arm and whatever arm is used might be movable or stationary upon its base.

With the parts assembled as shown in Figure 2 the two portions 7 and 15 are held against outward or axial displacement by the pin 18, 19. The head of the latter ordinarily fits much more snugly in the groove 10 than as shown in Figure 2. The clearance here has been considerably exaggerated to avoid confusion of the lines of the drawing. The fit of the parts is such that relative rotation or swiveling of the part 15 with respect to the part 7 is freely permitted. Swiveling is limited by the presence of the pin 12 which extends into the groove 10 and the head 19 of the pin 18 will contact the groove on one side or the other and rotation is thus limited to prevent twisting or damage to the wires running through the joint.

For some purpose no swinging action of the ball and socket joint is desired. If that is to be the case, the gland 36 is tightened sufficiently upon the member 15 to prevent any motion in the ball and socket joint. Ordinarily, motion is desirable and the gland will be only sufficiently tight to permit motion while still maintaining sufficient compression upon the spring 25 to hold the parts in any position of adjustment to which they may be moved.

With the device as shown therefore and assuming that the bracket arm 1 is mounted for movement, three types of movement are permitted, (1) the arm 1 may be moved; (2) swiveling may occur by rotating the lamp to cause relative movement of the parts 7 and 15; and (3) further tilting may occur in the ball and socket joint. This latter movement is indicated in the dotted line positions shown in Figure 1. The pin 39 extending into the slot 30 limits the ball and socket movement.

I claim:

1. In combination in a joint, a pair of hollow joint members secured together and shaped to fit one within the other and to have relative rotation when the joint is finally put together for use and means for holding them against axial separation, means for limiting their relative rotation, a ball and socket joint formed partly within one of said hollow members, there being a retaining member for said ball and socket joint engaging one of said hollow members, and a friction member positioned within said last mentioned hollow member and compression means bearing against said friction member, and means for limiting the movement of said ball and socket joint to a single plane.

2. In combination in a multi motion joint, a plurality of hollow housing members secured together and one penetrating within the other and mounted therein for relative rotational movement when the joint parts are secured together for use, means for holding said housing members against separation, said penetrating member carrying a rounded ball seat, and a third housing member positioned upon said penetrating housing member, a ball positioned partly within said penetrating member within said ball seat and partly within said third housing member, and means engaging said ball and holding the latter against movement in any but a single plane.

3. In combination in a multi motion joint, a plurality of hollow housing members secured freely together and one penetrating within the other and mounted therein for relative rotational movement about a common axis, means for holding said housing members against separation and a third housing member adjustably positioned upon said penetrating housing member, said penetrating member provided with two annular shoulders of different diameters, a ball positioned partly within said penetrating member and partly within said third housing member, and means mounted on said third housing member and engaging said ball and holding the latter against movement in any but a single plane, and frictional means mounted wholly within said penetrating housing member and adjacent one of said shoulders and comprising a friction part in contact with said ball, and a compression member bearing against the other of said shoulders and against said friction part and against said penetrating housing member.

VERMONT FOLLET.